US010808749B2

(12) United States Patent
Khosravani et al.

(10) Patent No.: US 10,808,749 B2
(45) Date of Patent: Oct. 20, 2020

(54) METHOD AND SYSTEMS FOR INSERTING A COATED FASTENER IN AN ASSEMBLY

(71) Applicant: THE BOEING COMPANY, Chicago, IL (US)

(72) Inventors: Shahriar Khosravani, Everett, WA (US); Darrin Michael Hansen, Seattle, WA (US); Blake A. Simpson, Kent, WA (US); Junghyun Ahn, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 76 days.

(21) Appl. No.: 15/686,227

(22) Filed: Aug. 25, 2017

(65) Prior Publication Data

US 2019/0063485 A1 Feb. 28, 2019

(51) Int. Cl.
| | |
|---|---|
| *F16B 39/22* | (2006.01) |
| *B25J 11/00* | (2006.01) |
| *B25J 9/16* | (2006.01) |
| *B25J 15/00* | (2006.01) |
| *B25J 13/08* | (2006.01) |
| *B64F 5/10* | (2017.01) |
| *B64D 45/02* | (2006.01) |
| *F16B 1/00* | (2006.01) |

(52) U.S. Cl.
CPC ........... *F16B 39/225* (2013.01); *B25J 9/1679* (2013.01); *B25J 9/1694* (2013.01); *B25J 11/005* (2013.01); *B25J 13/087* (2013.01); *B25J 15/0019* (2013.01); *B64D 45/02* (2013.01); *B64F 5/10* (2017.01); *F16B 2001/0021* (2013.01); *F16B 2001/0064* (2013.01); *Y10S 901/41* (2013.01); *Y10S 901/46* (2013.01)

(58) Field of Classification Search
CPC . B64F 5/10; B64D 45/02; B25J 9/1679; B25J 9/1694; B25J 11/005; B25J 13/087; B25J 15/0019; B29C 65/00; F16B 39/225; F16B 2001/0021; F16B 2001/0064; Y10S 901/41; Y10S 901/46; Y10T 29/49885; Y10T 29/49886
See application file for complete search history.

(56) References Cited

U.S. PATENT DOCUMENTS

| | | | |
|---|---|---|---|
| 3,257,178 A * | 6/1966 | Severns, Jr. et al. | C23C 4/10 428/656 |
| 3,894,466 A | 7/1975 | Wibrow | |
| 3,987,714 A | 10/1976 | Campbell | |
| 4,891,732 A * | 1/1990 | Jones | F16B 37/044 361/218 |
| 5,221,170 A | 6/1993 | Duffy et al. | |
| 5,785,478 A | 7/1998 | Rotter | |
| 6,729,531 B2 * | 5/2004 | Stevenson | B21J 15/027 228/112.1 |
| 2012/0019973 A1 * | 1/2012 | Ehrmantraut | B64D 45/02 361/218 |

(Continued)

*Primary Examiner* — Bayan Salone
(74) *Attorney, Agent, or Firm* — Armstrong Teasdale LLP (57) ABSTRACT

A fastening device for coupling an assembly includes a fastener comprising a head, a threaded portion, and a shank extending between the head and the threaded portion. The fastening device also includes a coating formed around the fastener, wherein the coating is electrically conductive and comprises a varying thickness along the shank.

25 Claims, 7 Drawing Sheets

(56) References Cited

U.S. PATENT DOCUMENTS

| | | | |
|---|---|---|---|
| 2013/0259604 A1* | 10/2013 | Whitlock | B64D 45/02 411/500 |
| 2015/0337885 A1* | 11/2015 | Whitlock | B64D 45/02 411/411 |
| 2016/0053801 A1* | 2/2016 | Rawls | F16B 39/225 156/66 |
| 2016/0068726 A1* | 3/2016 | Snyder | C08G 59/504 |

* cited by examiner

METHOD AND SYSTEMS FOR INSERTING A COATED FASTENER IN AN ASSEMBLY

BACKGROUND

The field of the disclosure relates to a fastener configured to couple structural components of a structure, and more particularly, to a coated fastener which provides electrical conductivity between the structural components.

Structures and particularly aircraft are designed to withstand lightning strikes and maintain their structural integrity. Traditional construction of aircraft, for example, included metallic structural elements being secured together with metallic fasteners. The fasteners were electrically grounded to the metallic structural elements with the metallic fasteners being in contact with the metallic structural elements. This arrangement provided electrical conductivity between the fastener and the structural element thereby not electrically isolating the fastener from the structural elements. Isolating the fastener would otherwise provide an undesired electrostatic force between the fastener and the structural element upon the occurrence of a lightning strike to the aircraft.

Aircraft are more recently being constructed of structural components made of a lightweight composite material. The composite material comprises a matrix material, often a resin, and a fiber material such as carbon fiber. This composite material is often carbon fiber reinforced plastic ("CFRP") and is less conductive than traditional metal structural elements. The CFRP structural elements are secured together with fastener assemblies. At least some fastener assemblies include a bolt or a pin and a mating part (e.g., a nut or a collar) and do not include a sleeve surrounding the bolt or a pin. The fastener assembly used to fasten a structural element constructed of CFRP may not necessarily be electrically grounded to the CFRP structural element. Rough surfaces of the bolt and rough surfaces of the structural element can create gaps between the surface of the metallic bolt and that of the CFRP. The poor electrical connectivity between the metallic bolt and the CFRP can lead to an electrostatic force build-up in the electrically conductive fibers of the CFRP. Such electrostatic force build-up in the conductive fibers may corrode the resin of the CFRP and may result in ejection of high temperature particles from the gaps between the CFRP and the fastener.

One way to mitigate this behavior in CFRP joints is to incorporate sleeved fasteners installed in an interference condition between the fastener and the structural element to achieve closer proximity of the carbon fiber to the fastener. However, drilling the holes to receive the fasteners may result in creating crevices in the CFRP more than an order of magnitude deeper than the diameter of the carbon fibers. Furthermore, sleeved fasteners are expensive and require lengthy installation and inspection procedures that increase the overall manufacturing time and costs of the aircraft.

BRIEF DESCRIPTION

In one aspect, a fastening device for coupling an assembly is provided. The fastening device includes a fastener comprising a head, a threaded portion, and a shank extending between the head and the threaded portion. The fastening device also includes a coating formed around a portion of the fastener, wherein the coating is electrically conductive and comprises a varying thickness along the shank.

In another aspect, a method for installing a fastener into an assembly is provided. The fastener includes a coating disposed thereon. The method includes positioning the fastener into an end effector located proximate the assembly and heating the fastener and the coating to a melting temperature of the coating to place the coating into a softened state. The method also includes inserting the fastener into an opening formed in the assembly such that a sidewall of the opening causes the coating to deform during insertion.

In yet another aspect, a method of fabricating a fastening device is provided. The method includes applying an electrically conductive coating to a fastener, wherein the fastener includes a head, a threaded portion, and a shank extending between the head and the threaded portion. The method also includes modifying the coating such that the coating includes a varying thickness of the coating along the shank of the fastener.

In still another aspect, a fastener insertion system is provided. The fastener insertion system includes an end effector configured to insert a fastening device into an opening of an assembly. The fastening device includes a fastener and an electrically conductive coating coupled to the fastener. The fastener insertion system also includes an induction coil coupled to the end effector and configured to heat the coating to a melting temperature of the coating to place the coating into a softened state. A sensor is configured to measure a temperature of the induction coil, and a processor is communicatively coupled to the end effector, the induction coil, and the sensor. The processor is configured to control operation of at least the induction coil to maintain the induction coil at the melting temperature of the coating.

The features, functions, and advantages that have been discussed can be achieved independently in various embodiments or may be combined in yet other embodiments further details of which can be seen with reference to the following description and drawings.

DETAILED DESCRIPTION

The implementations described herein include a fastening device insertion system that inserts a fastener having an electrically conductive coating into an opening formed in a structural assembly to facilitate increasing conduction between the fastener and the structural assembly. The fastening device includes a fastener having a coating disposed thereon wherein a thickness of the coating varies along at least a portion of a shank of the fastener. In one embodiment, the coating includes a first thickness at a point proximate a first end of the shank and a second, smaller, thickness at an opposing, second end of the shank. The varying thickness of the coating facilitates forming a substantially even layer of the coating on the fastener after insertion into the structural assembly. The coating is applied to the fastener and then modified to achieve the desired coating profile with the varying thickness. The fastener insertion system includes an induction coil to heat the coating to its melting temperature and an end effector to insert the fastening device having the at least partially melted coating into the structural assembly.

During assembly, the softened coating acts as a lubricant to significantly reduce the amount of force required to insert the fastening device into the structural assembly, and, as such, reduces damage to the structural components themselves that may result in a reduction in the service lifetime of the structural assembly. Additionally, the coating substantially fills a gap between the fastener and the structural assembly to provide a continuous electrical connection between the fastener and the conductive fibers of the structural assembly.

Figure 1:
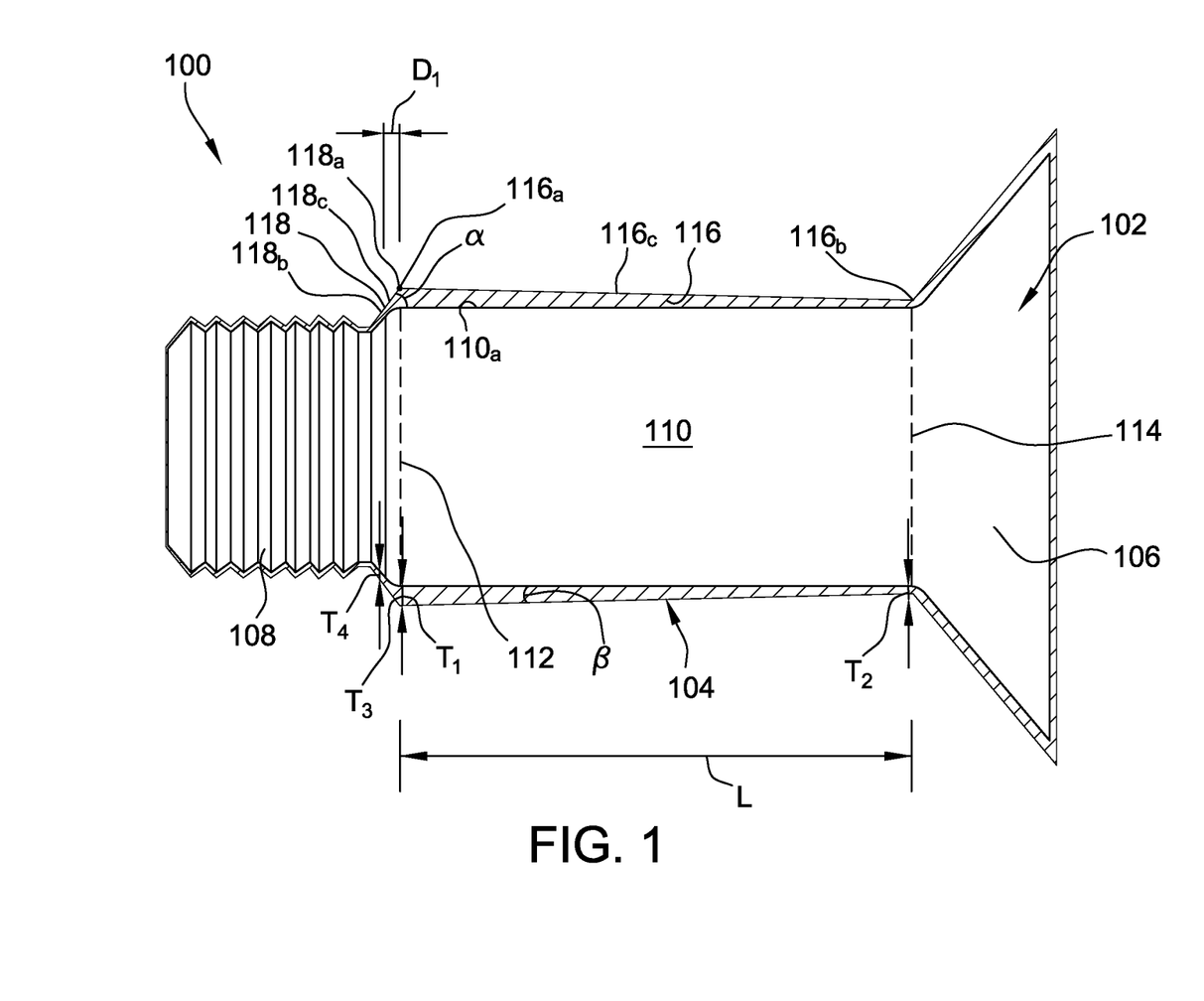
FIG. 1 is a cross sectional view of an exemplary fastening device for use in coupling two structural members.
Figure 2:
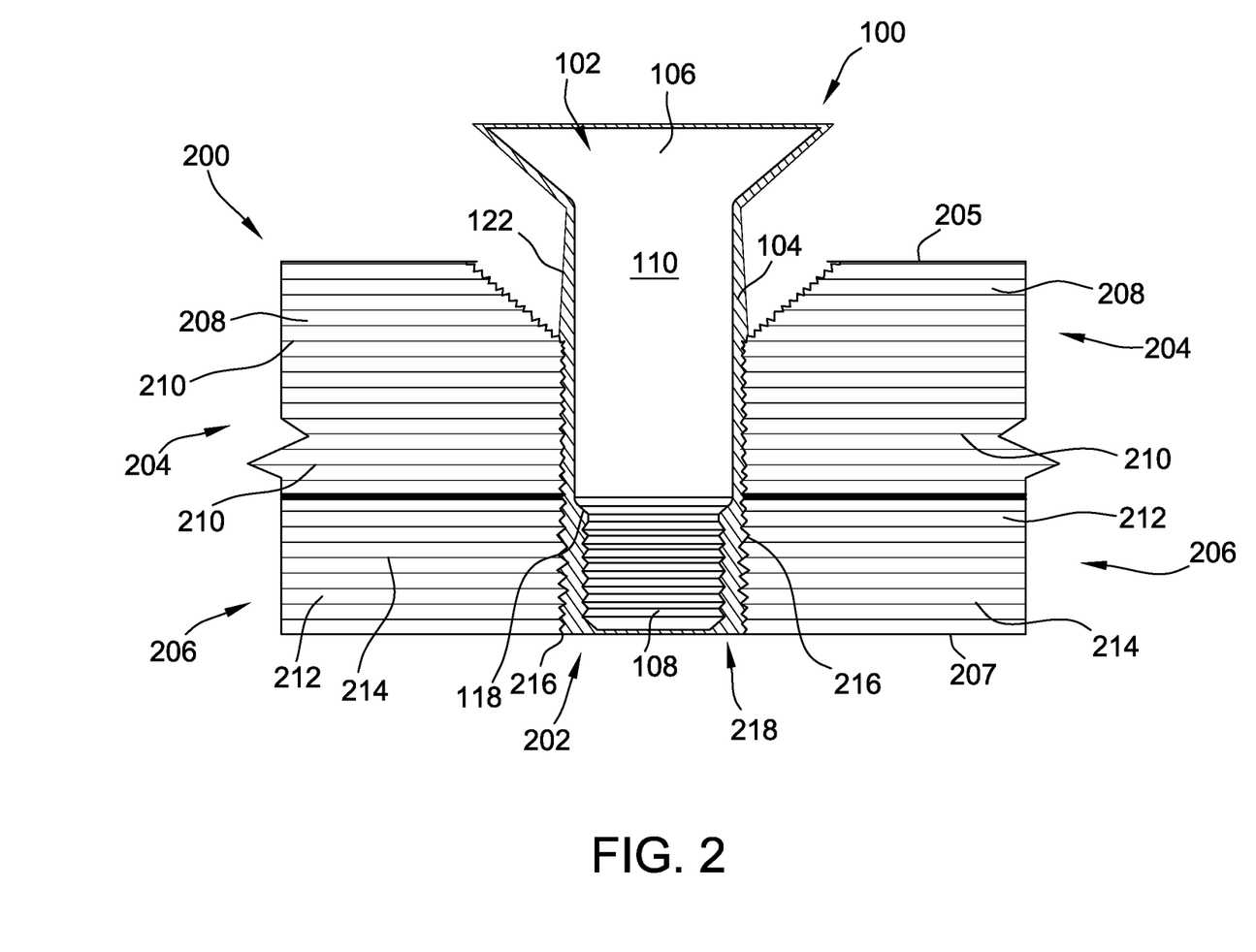
FIG. 2 is a cross sectional view of the fastening device shown in FIG. 1 partially inserted into an opening formed in the two structural members.
Figure 3:
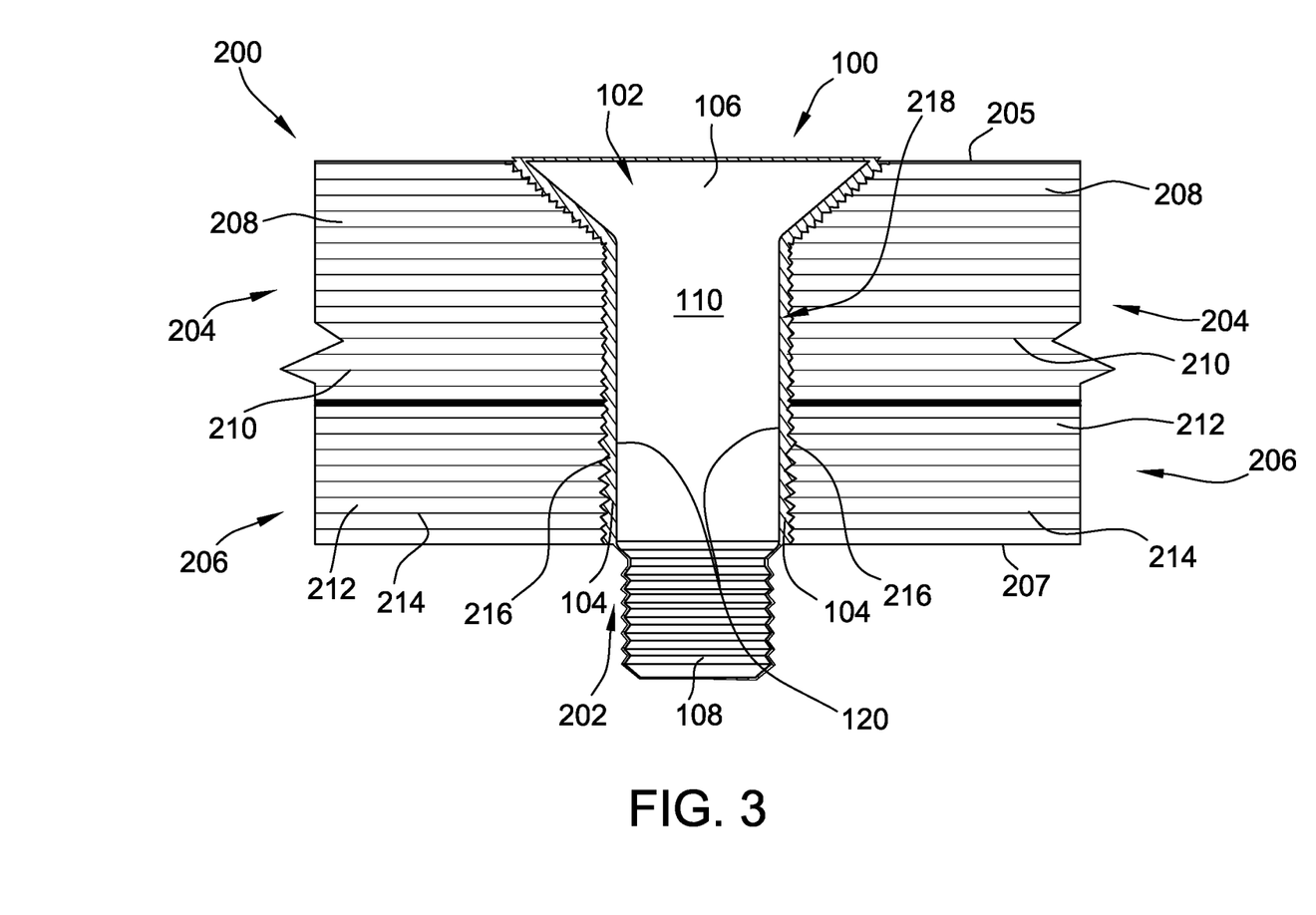
FIG. 3 is a cross sectional view of the fastening device shown in FIG. 1 fully inserted into the opening formed in the two structural members.

FIG. 1 is a cross sectional view of an exemplary fastening device 100 for use in coupling two structural members of an assembly (such as the structural assembly shown in FIG. 2). FIG. 2 is a cross sectional view of fastening device 100 partially inserted into an opening 202 formed in a structural assembly 200. FIG. 3 is a cross sectional view of fastening device 100 fully inserted into opening 202. As shown in FIG. 2, structural assembly 200 includes a first structural member 204 and a second structural member 206. Opening 202 is defined through both first structural member 204 and second structural member 206. More specifically, the opening 202 is defined by a sidewall 216 that extends between a first surface 205 of structure 204 and a second surface 207 of structure 206.

In the exemplary implementation, structural members 204 and 206 are carbon fiber reinforced plastic ("CFRP") materials. In other implementations, one of structural members 204 and 206 are formed from a metallic material, such as, but not limited to, aluminum or titanium. Accordingly, fastening device 100 is configured for use in CFRP stack-up assemblies or CFRP-metallic hybrid stack-up assemblies.

As shown in to FIG. 1, the exemplary implementation of fastening device 100 includes a fastener 102 and a coating 104 disposed or coupled to fastener 102. The fastener 102 includes a head 106, a threaded portion 108, and a shank 110 extending between the head 106 and the threaded portion 108. In the exemplary embodiment shown in FIG. 1, coating 104 completely surrounds and encases fastener 102 such that fastener 102 is encapsulated by coating 104. In other implementations, coating 104 covers only a portion of fastener 102. For example, in one implementation, the head 106 of fastener 102 is not covered by coating 104 and is left exposed whereas the shank 110 and/or the threaded portion 108 are covered with the coating 104. Fastener 102 is constructed of metal, such as, but not limited to, carbon, steel, Inconel, and a titanium alloy.

Shank 110 includes a first end 112 (shown as a dashed line) proximate threaded portion 108 and an opposing second end 114 (also shown as a dashed line) proximate head 106. It should be realized that in the exemplary embodiment, that the head 106, the threaded portion 108, and the shank 110 are all formed as a unitary device and that the dashed lines are used to delineate the locations of the first and second ends 112, 114 of the shank 110. In the exemplary implementation, coating 104 is formed from an electrically conductive material and has a thickness that varies along a length L of the shank 110. More specifically, coating 104 includes a first coating portion 116 having a first end 116a and a second end 116b. In the exemplary embodiment, the first end 116a is proximate the first end 112 of the shank 110 and the second end 116b is proximate the second end 114 of the shank 110 such that the first coating portion 116 extends along the length L of the shank 110.

The first coating portion 116 has a first thickness T1 at the first end 112 of shank 110 and a second thickness T2 at the second end 114 of shank 110. In the exemplary implementation, first thickness T1 is greater than second thickness T2 to facilitate even distribution of coating 104 along the length L of the shank 110 during insertion of fastening device 100 into structural assembly 200 as is described in more detail below. Furthermore, first thickness T1 defines the greatest thickness of first coating portion 116 such that the first coating portion 116 tapers from the shank first end 112 to the shank second end 114. It should be realized that although the exemplary embodiment describes the first coating portion 116 extending from the shank first end 112 to the shank second end 114, the first coating portion 116 may extend along only a portion of the length L of shank 110. As an example, the first coating portion first end 116a may coincide with the first end 112 of the shank 110, but extend along only a portion of the length L of the shank 110 such that the second end 116b of the first coating portion 116 terminates prior to the head 106.

In the exemplary implementation, the coating 104 also includes a second coating portion 118 that extends from first coating portion 116 at least partially along a length of the threaded portion 108. In the exemplary embodiment, the second coating portion 118 is oriented at an oblique angle with respect to an exterior surface 110a of the shank 110.

More specifically, the second coating portion 118 has a first end 118a that is coincident with the first end 116a of the first coating portion 116. The second coating portion 118 also has a second end 118b that terminates a distance D1 from the first end 118a. In the exemplary embodiment, the first end 118a of the second coating portion 118 has a thickness T3 that is substantially the same as the thickness T1 of the first end 116a of the first coating portion 116. Moreover, the second end 118b of the second coating portion has a thickness T4 that is less than the thickness T3 such that the second coating portion 118 tapers from the first end 118a to the second end 118b.

An exterior surface 118c of the second coating portion 118 extends obliquely from an exterior surface 116c of the first coating portion 116 and the exterior surface 110a of the shank 110. As such, the exterior surface 118c of the second coating portion 118 forms an angle α within a range of approximately 35 degrees and approximately 55 degrees with respect to shank surface 110a. More specifically, the exterior surface 118c of the second coating portion 118 forms an angle α of approximately 45 degrees with respect to shank surface 110a. Alternatively, the exterior surface 118c of the second coating portion 118 may extend any distance along the length of the threaded portion 108 and define any angle with respect to shank surface 110a that facilitates operation of fastening device 100 as described herein.

Furthermore, the exterior surface 116c of the first coating portion 116 also extends at an oblique angle between the first end 116a and the second end 116b. As such, the exterior surface 116c of the first coating portion 116 extends extends a distance along the length L of the shank 110, which in the exemplary embodiment is substantially the same as the length L of the shank 110. The distance that the first coating portion 116 extends along the shaft 110 is therefore greater than the distance D1. As such, the exterior surface 116c forms an angle β within a range of approximately 8 degrees and approximately 15 degrees with respect to shank surface 110a. Alternatively, the exterior surface 116c may extend any distance along shank 110 and define any angle with respect to shank surface 110a that facilitates operation of fastening device 100 as described herein.

In the exemplary implementation coating 104 is an electrically conductive low-melting temperature alloy (LMA). In the exemplary embodiment, coating 104 is formed from a bismuth alloy. For example, in one implementation, coating 104 is formed from an alloy of bismuth and indium. In another implementation, coating 104 is formed from an alloy of bismuth, indium, and tin. More specifically, in such a composition, coating 104 includes approximately 45-55% by weight indium, approximately 30-35% by weight bismuth, and approximately 12-20% tin. For example, one embodiment of coating 104 includes 51% by weight indium, 32.5% by weight bismuth, and 16.5% by weight tin. Alternatively, coating 104 includes any combination of bismuth and indium and, optionally, tin that facilitates operation of fastening device 100 as described herein.

In the exemplary implementation, coating 104 has a melting temperature above 180 degrees Fahrenheit (82.2 degrees Celsius). Generally, coating 104 has a melting temperature above a maximum temperature expected to experienced by the carbon fiber reinforced plastic ("CFRP") during operation of the aircraft 10 (shown in FIG. 8). Furthermore, coating 104 has a melting temperature above a maximum temperature experienced by the CFRP in a finish curing process. As such, coating 104 will not melt or soften during operation of aircraft 10 or during a final curing process of the CFRP.

In the exemplary implementation, bismuth is a preferred component of coating 104 because it has been shown to be non-reactive with both titanium and CFRP materials, which facilitates extending the service lifetime of fastening device 100, as described in further detail below. Additionally, bismuth has a melting temperature above 180 degrees Fahrenheit and so will not melt or soften during operation of aircraft 10 or during a final curing process of the CFRP.

In one implementation, coating 104 is applied as a liquid sprayed onto fastener 102. Alternatively, coating 104 is applied by dipping fastener 102 into a volume of liquid coating material. Generally, coating 104 is applied using any method than facilitates operation of fastening device 100 as described herein. In any case, multiple applications of coating 104 may be applied to the fastener 102 in order for coating 104 to reach a desired thickness. For example, initially, the fastener 102 may be repeatedly dipped into a volume of coating material in order to build up coating 104 that has a desired thickness that is substantially uniform along the length of the shank 110. Although the coating application steps are described herein as applying to a single fastener, it is considered that tens or hundreds of fasteners 102 can have coating 104 applied thereto simultaneously.

Once the desired thickness is obtained, coating 104 may be modified such that coating 104 includes the varying thickness along shank 110, as described above. In one implementation, modifying coating 104 is performed by inserting fastener 102 with coating 104 into a mold before coating 104 has solidified. The mold includes an internal profile that is complementary to the desired profile of the coating 104. Once the coating 104 has solidified, the fastening device 100 is removed from the mold and includes the uneven, varying profile of coating 104 along shank 110 described above. In another implementation, after coating 104 has solidified onto fastener 102, the resultant fastening device 100 is heated to place coating 104 into a softened or malleable state and the fastening device 100 is then placed inside a mold to form the varying thickness of coating 104 over shank 110. In yet another implementation, the fastening device 100 is subjected to post-manufacturing machining to achieve the desired varying profile of coating 104. For example, a portion of coating 104 may be removed from fastening device 100 to form the varying thickness along shank 110.

Referring now to FIG. 2, structural assembly 200 is shown that may installed on, or form part of, an aircraft 10 (shown in FIG. 8). First structural member 204 is formed from a composite material including a matrix material 208 and a plurality of fibers 210 positioned to extend through matrix material 208. Similarly, second structural member 206 is also formed from a composite material including a matrix material 212 and a plurality of fibers 214 positioned to extend through matrix material 212. Matrix materials 208 and 212 may be the same material. For example, in one implementation, matrix materials 208 and 212 are formed from one of a thermoplastic resin such as polypropylene, polyethylene and nylon or thermosetting resin such as an epoxy. Similarly, fibers 210 and 214 may be formed from the same material. For example, in one implementation, fibers 210 and 214 are constructed of electrically conductive material such as, but not limited to, carbon. In the exemplary implementation first and second structural members 204 and 206 are formed from CFRP. Alternatively, one of first and second structural members 204 and 206 is formed from a metallic component, such as, but not limited to, aluminum or titanium, and alloys thereof As shown in FIG. 2, opening 202 is defined through first and second structural members 204 and 206. Opening 202 may be either pre-formed in first and second structural members 204 and 206, or may be drilled through first and second structural members 204 and 206. In forming opening 202 through composite material of first and second structural members 204 and 206, a sidewall 216 is formed in first and second structural members 204 and 206, wherein sidewall 216 defines opening 202. Additionally, the diameter of opening 202 is dimensioned to be slightly larger than the diameter of fastener 102 to enable fastener 102 to extend through first and second structural members 204 and 206 without creating significant friction between structural members 204 and 206 and fastener 102. As such, a gap 218 is formed between fastener 102 and first and second structural members 204 and 206. More specifically, gap 218 is defined as the volume of space between fastener 102 and sidewall 216 of first and second structural members 204 and 206.

In the exemplary implementation, coating 104 is positioned between sidewall 216 and shank surface 110a and conforms to the shape of gap 218 such that coating 104 fills gap 218 when inserted into opening 202 by an end effector. In order for coating 104 to deform from its pre-installation shape as shown in FIG. 1 to conform to its post-installation shape, i.e. the shape of the gap 218, coating 104 is preheated to the melting temperature of coating 104, which is above 180 degrees Fahrenheit. Preheating is performed, in the exemplary implementation, by placing fastening device 100 with coating 104 into an induction coil, such as induction coil 304 described in more detail below, for a predetermined amount of time prior to inserting fastening device 100 into the opening 202. The induction coil is coupled to the end effector and is preset to the melting temperature of coating 104, for example, 180 degrees Fahrenheit, which can be measured by a temperature sensor coupled to the induction coil.

Additionally, a timing circuit is coupled to the induction coil to measure the amount of time the fastening devices 100 are located in the induction coil. As the induction coil is set to the melting temperature of coating 104, it is known that coating 104 will reach its desired melting point at a specific time. The time duration is long enough to place coating 104 into a softened state, but not so long as to cause coating 104 to melt and disengage from fastener 102. For example, fastening device 100 is positioned in the induction coil for a period within a range of between 5 seconds and 30 seconds. Alternatively, any heating method may be used to place coating 104 into a softened state to enable deformation of coating 104 during insertion as described herein.

As described herein, a processor is communicatively coupled to the end effector, the induction coil, the temperature sensor, and the timing circuit. The processor correlates signals received from the induction coil, the temperature sensor, and the timing circuit and instructs the end effector when predetermined criteria have been met to install fastening device 100.

As shown in FIGS. 2 and 3, coating 104, in its heated softened state during and immediately after insertion, is in contact with shank surface 110a of fastener 102 and extends from shank surface 110a to substantially fill gap 218. In the exemplary implementation, coating 104 contacts at least a portion of plurality of fibers 210 and 214 of first and second structural members 204 and 206, respectively. In such a configuration, coating 104 establishes an electrical connection between fibers 210 and 214 and fastener 102, thereby grounding fastener 102. In extending across gap 218, coating 104 comes into contact and conforms to the sidewall 216. As described herein, coating 104 occupies gap 218 and provides a continuous electrical connection between fastener 102 and fibers 210 and 214 of structural assembly 200. As used herein, the term "rough" is meant to describe the course, irregular nature of sidewall 216 as a result of drilling opening 202.

Figure 4:
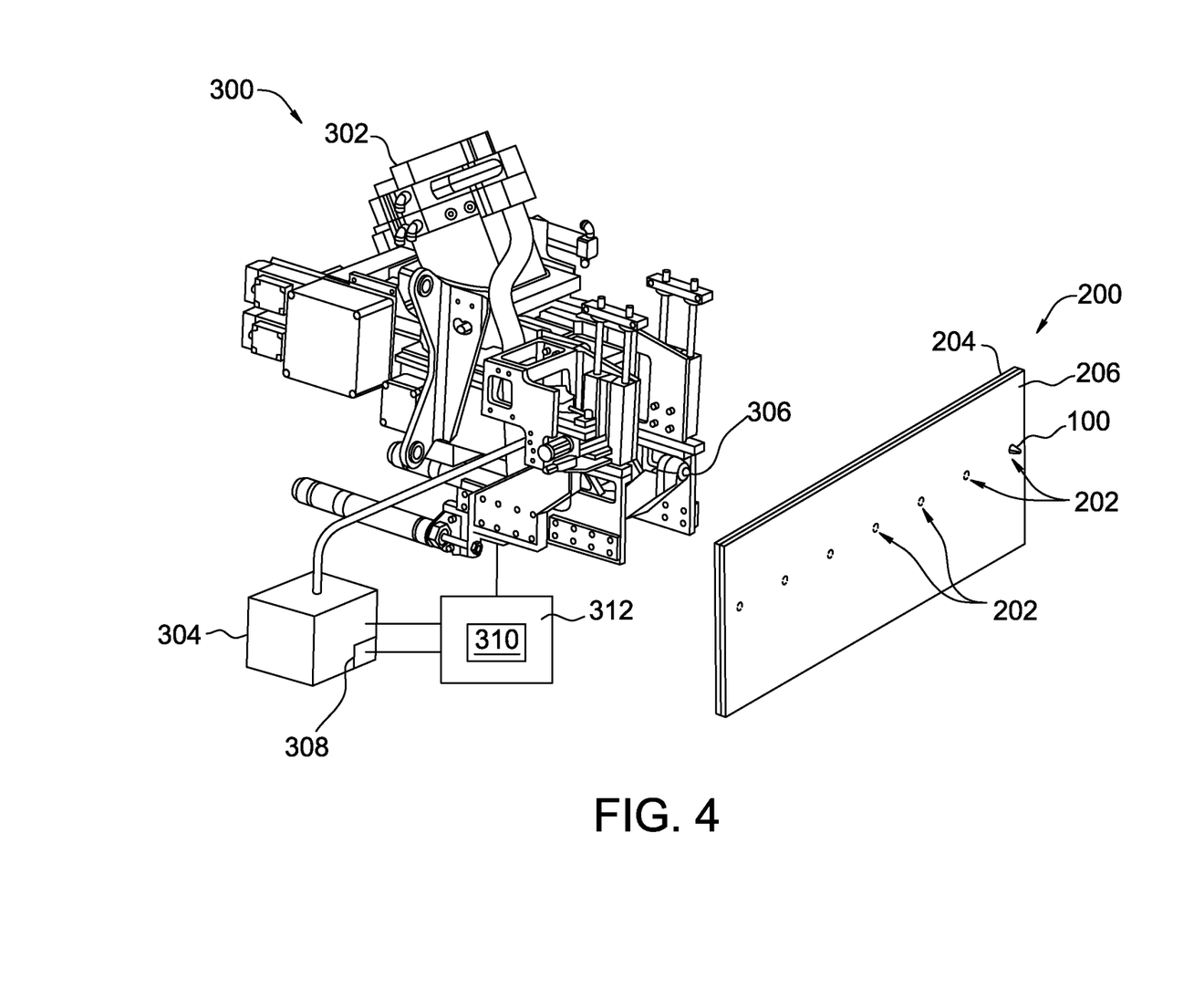
FIG. 4 is a diagram illustrating an exemplary fastener insertion system positioned at an insertion location and illustrating the fastening device shown in FIG. 1 inserted in a structural assembly.

FIG. 4 is a diagram illustrating an exemplary fastener insertion system 300 positioned at an insertion location proximate to the structural assembly 200. As mentioned above, fastening device 100 is utilized to provide an attachment between first structural member 204 and second structural member 206. Fastener insertion system 300 includes an end effector 302, couplable to a robotic arm (not shown), to locate a drilling location on structural assembly 200 and drill opening 202 through both first structural member 204 and second structural member 206.

In the exemplary implementation, fastener insertion system 300 also includes an induction coil 304 coupled to end effector 302, a fastener feed head 306 coupled to end effector 302, a temperature sensor 308 coupled to induction coil 304, a timing circuit 310 communicatively coupled to induction coil 304, the temperature sensor 308, and the end effector 302. The fastener insertion system 300 also includes a processor 312 that includes timing circuit 310 and is also communicatively coupled to induction coil 304 and end effector 302 in addition to temperature sensor 308.

In operation, a plurality of fastening devices 100 are loaded into end effector 302. In turn, each fastening device 100 is transported to induction coil 304, which is preset to the melting temperature of coating 104. Temperature sensor 308 continuously measures the temperature within induction coil 304 and is configured to send a signal to processor 312 if temperature sensor 308 senses a change in temperature outside a predetermined temperature range. Processor 312 can then control induction coil 304 to modify the temperature of induction coil 304 to be within the desired temperature range.

Fastening device 100 remains within induction coil 304 for a predetermined amount of time. More specifically, fastening device 100 is inserted into induction coil 304 for a predetermined amount of time required to at least partially melt coating 104. Timing circuit 310 measures the amount of time fastening device 100 is positioned in induction coil 304. Because induction coil 304 is set to the melting temperature of coating 104, it is known that coating 104 will reach its desired melting point after a specific amount of time. The time duration is long enough to place coating 104 into a softened state, but not so long as to cause coating 104 to melt and disengage from fastener 102. For example, fastening device 100 is positioned in the induction coil for a period within a range of between 5 seconds and 30 seconds. Alternatively, fastening device 100 is positioned in the induction coil for any time period that facilitates operation of insertion system 300 as described herein. Timing circuit 310 measures how long fastening device 100 has been in induction coil 304 and sends a signal to processor 312 when the predetermined time period has elapsed and fastening device 100 is ready to be inserted into assembly 200. Processor 312 is communicatively coupled to timing circuit 310, induction coil 304, temperature sensor, and end effector 302 and is configured to send and receive signals therebetween to control the operation of fastener insertion system 300.

Once coating 104 has reached its melting point and is at least partially melted, fastener feed head 306 of the fastener insertion system 300 is utilized to insert fastening device 100 into opening 202 formed in structural assembly 200. Fastener feed head 306 removes fastening device 100 from induction coil 304, aligns fastening device 100 with opening 202, and inserts fastening device 100 into opening 202. Alternatively, a fastener feed system (not shown) transports fastening device 100 from induction coil 304 to fastener feed head 306 for insertion by fastener feed head 306 into opening 202. As such, in the exemplary implementation, each fastening device 100 is heated to the melting temperature of coating 104 immediately prior to being inserted into opening 202 of structural assembly 200.

After heating, coating 104 is in an at least partially melted, or softened, state. The partially melted coating 104 acts as a lubricant during insertion and reduces the amount of force required to insert fastening device 100 into opening 202. As such, fastener 102 acts as a delivery mechanism for the lubricant coating 104 during insertion. Referring again to FIGS. 2-4, as the point of greatest thickness T1 of coating 104 makes contact with rough sidewall 216 of first and second structural members 204 and 206, and fastening device 100 is advanced through opening 202, rough sidewall 216 spreads coating 104 along at least shank 110 of fastener 102 such that coating 104 has a substantially uniform thickness after insertion. As best shown in FIG. 3, once fastening device 100 is inserted into opening 202, coating 104 conforms to the shape of gap 218 between fastener 102 and sidewall 216 and provides electrical conductivity between fastener 102 and pluralities of fibers 210 and 214. After insertion, coating 104 solidifies to form an interference fit between fastener 102 and structural members 204 and 206.

Figure 5:
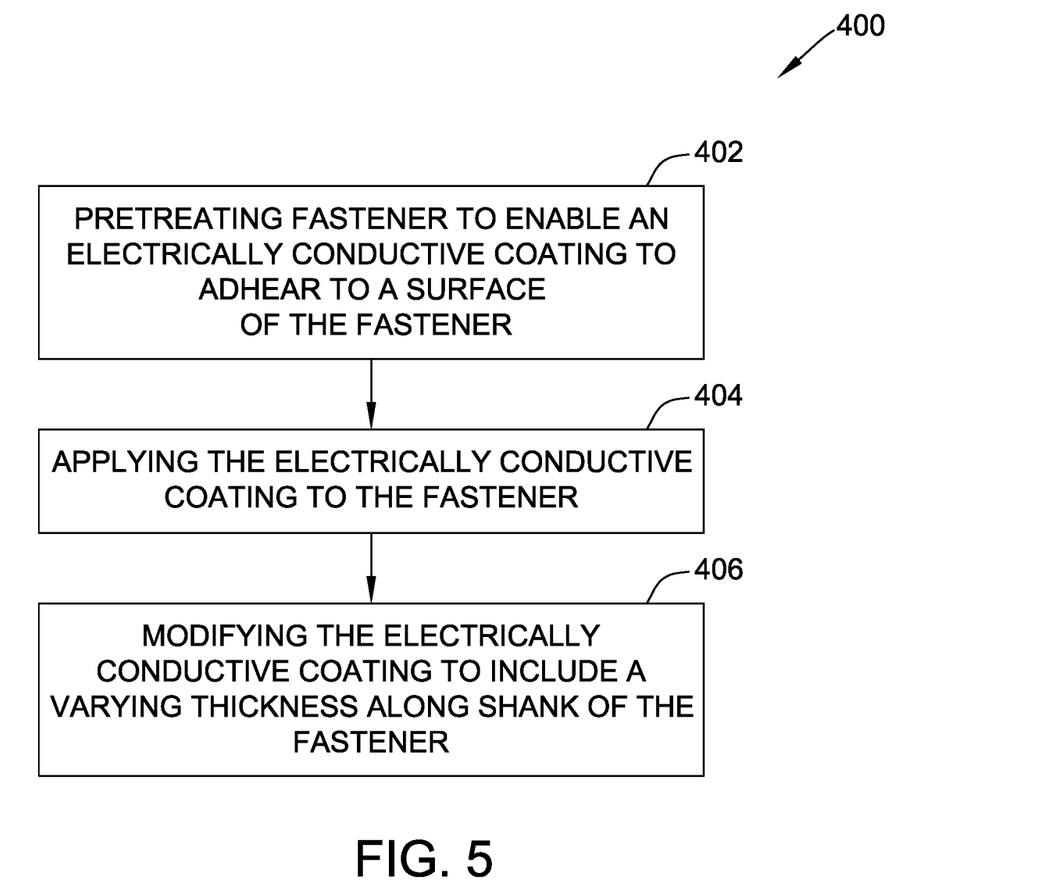
FIG. 5 is a flowchart illustrating a method of fabricating the fastening device shown in FIG. 1.

FIG. 5 is a flowchart illustrating a method 400 of fabricating the fastening device shown in FIG. 1. Method 400 includes pretreating 402 the fastener to enable an electrically conductive coating to adhere to a surface of the fastener. More specifically, pretreating 402 includes performing a nickel strike process to the fastener before applying the electrically conductive coating. The nickel strike process includes applying a thin layer (less than 0.0001 inch) of nickel to the surface of the fastener. A copper strike process, where a similarly thin layer of copper is applied to the fastener, can also be used. Alternatively, the surface of the fastener can be pretreated using an abrasive blasting treatment. Pretreating the surface of the fastener with a nickel strike, a copper strike, or abrasive blasting facilitates increased adhesion of the coating to the fastener.

Furthermore, method 400 includes applying 404 the electrically conductive coating to the fastener. As described herein, applying 404 the coating includes at least one of repeatedly spraying the coating onto the fastener and/or dipping the fastener into the coating. In one implementation, the entire surface of the fastener, including the shank and the head, is covered by the coating. In another implementation, the head of the fastener is not covered and is left exposed. In yet another implementation, the coating is applied only to the shank of the fastener. Additionally, applying 404 the coating includes applying an electrically conductive low-melting temperature alloy (LMA), such as but not limited to, a bismuth alloy containing indium and, optionally, tin. In the exemplary implementation, applying 404 the coating includes applying a coating that has a melting temperature above 180 degrees Fahrenheit (82.2 degrees Celsius).

Method 400 also includes modifying 406 the coating such that the coating has a varying thickness along a shank of the fastener. More specifically, modifying 406 the coating includes forming a first thickness of the coating proximate a first end of the shank and forming a second thickness of the coating at a second end of the shank such that the first thickness is greater than the second thickness. In the exemplary implementation, modifying 406 the coating includes inserting the fastener and the coating into a mold. More specifically, the fastener and the coating are inserted into the mold before the coating solidifies onto the fastener and while the coating is still malleable.

Figure 6:
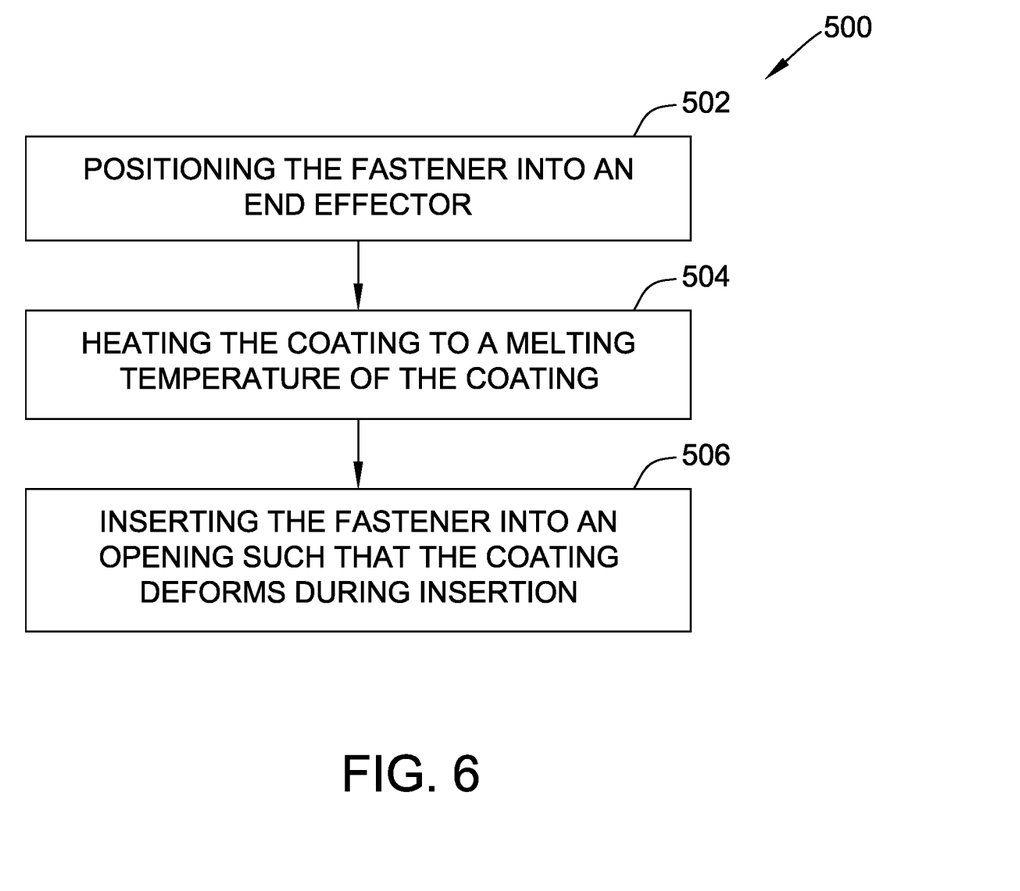
FIG. 6 is a flowchart illustrating a method for assembling a structure utilizing the described embodiments.

FIG. 6 is a flowchart illustrating a method 500 for installing a fastening device into a structural assembly. Method 500 includes positioning 502 the fastener with the coating into an end effector located proximate the structural assembly and heating 504 the fastener and coating to the melting temperature of the coating such that the coating at least partially melts into a softened state. In the exemplary implementation, heating 504 the fastener and the coating includes heating 504 the fastener and the coating using an induction coil coupled to an end effector of the fastener insertion system.

After the coating is heating to it melting temperature and is at least partially melted in a softened state, method 500 includes inserting 506 the fastener into the opening formed in the structural assembly such that the coating deforms during insertion and fills the gap defined between the fastener and the sidewall of the structural assembly. More specifically, as described herein, the coating includes a varying thickness such that when a point of the greatest thickness of the coating contacts the edges of the opening, the rough inner surface of the opening spreads the coating along at least a portion of the fastener such that the coating has a substantially uniform thickness after insertion. As such, the coating extends from the surface of the fastener and contacts at least a portion of a plurality of fibers of the structural members that make up the structural assembly. In such a configuration, the conductive coating establishes an electrical connection between the fibers and the fastener, thereby grounding the fastener.

Figure 7:
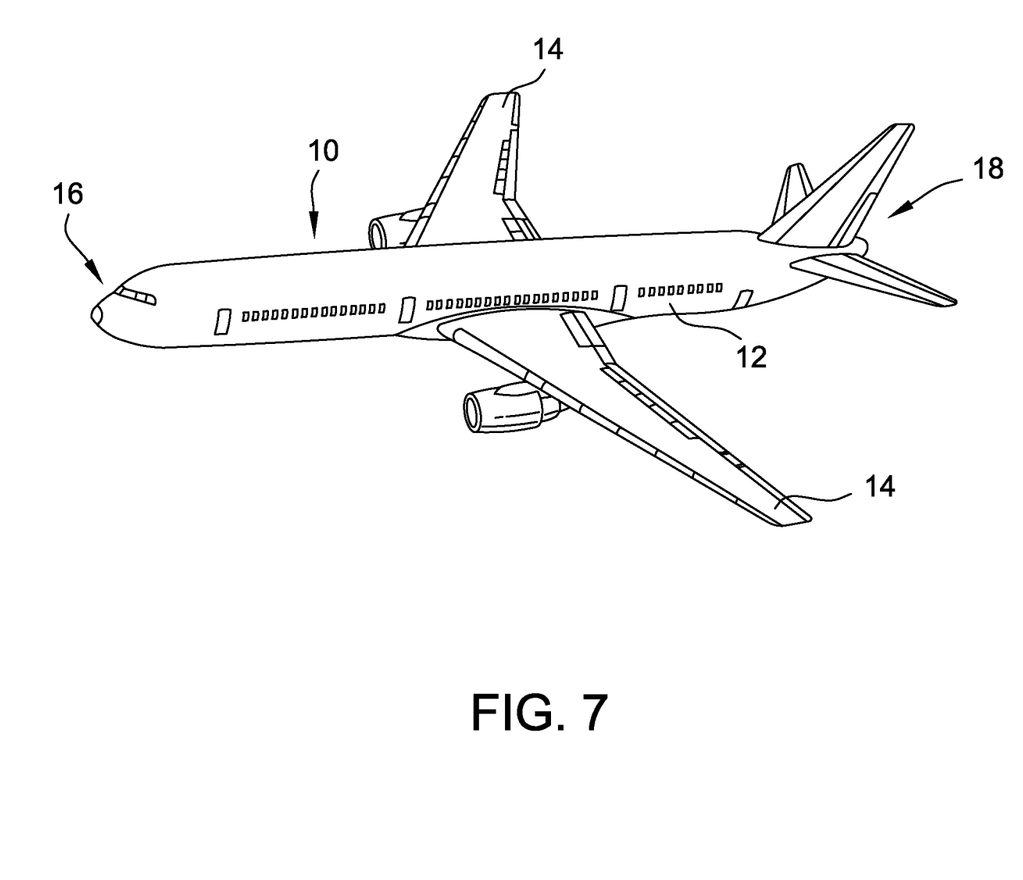
FIG. 7 is a side elevation view of an aircraft.

Referring to FIG. 7, an example of an assembled structural assembly, aircraft 10 is shown. Aircraft 10 includes various sections to its assembly. These sections, in this example, include a fuselage 12 and wings 14 extending from opposing sides of fuselage 12. Fuselage 12 also includes a nose section 16 and an opposing tail section 18. Each of these sections of aircraft 10 can be selectively constructed with structural elements constructed of at least one element containing a composite material, as is described above.

The examples described herein include a fastener insertion system that inserts a fastener having an electrically conductive coating into an opening formed in a structural assembly to facilitate conducting electricity between the fastener and the structural assembly. The fastener includes a varying thickness of the coating along at least a portion of the shank of the fastener to facilitate forming a substantially even layer of the coating on the fastener after insertion into the structural assembly. The coating is applied to the fastener and then the coating is modified to achieve the desired coating profile with the varying thickness. The fastener insertion system includes an induction coil to heat the coating to its melting temperature and an end effector to insert the fastener and the at least partially melted coating into the structural assembly.

The softened coating acts as a lubricant to reduce the amount of force required to insert the fastening device into the structural assembly, and, as such, reduces the risk of any incidents that cause a reduction in the service lifetime of the structural assembly. Additionally, the coating substantially fills a gap between the fastener and the opening in the structural assembly to provide a continuous electrical connection between the fastener and the conductive fibers of the structural assembly.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fastening device for insertion into an opening, the fastening device comprising:
   a fastener comprising a head and a shank extending from said head; and
   a coating formed on said fastener, wherein said coating is malleable when a heat source is applied, wherein said coating is electrically conductive and comprises a varying thickness along said shank prior to insertion into the opening, and wherein the coating includes a more uniform thickness after insertion into the opening.

2. The fastening device of claim 1, wherein said shank comprises a first end and an opposing second end, wherein said coating has a first thickness proximate to the shank first end and a second thickness proximate to the shank second end, said first thickness being greater than said second thickness.

3. The fastening device of claim 1, wherein said coating includes a first coating portion extending between a shank first end and a shank second end, the first coating portion having a first thickness proximate to the shank first end and a second thickness proximate the shank second end.

4. The fastening device of claim 3, wherein said fastener comprises a threaded portion extending from said shank, wherein said coating includes a second coating portion extending a first distance along said threaded portion, wherein said first distance is substantially similar to said first thickness.

5. The fastening device of claim 3, wherein said first coating portion is formed unitarily with the second coating portion.

6. The fastening device of claim 1, wherein said coating comprises a bismuth alloy.

7. The fastening device of claim 1, wherein said coating has a melting temperature above 180 degrees Fahrenheit (82.2 degrees Celsius).

8. A method of fabricating a fastening device, said method comprising:
applying an electrically conductive coating to a fastener, the fastener including a head and a shank extending from the head; and
modifying the coating such that a thickness of the coating varies along the shank of the fastener, wherein modifying the coating comprises inserting the fastener with the coating into a mold to modify the shape of the coating such that the thickness of the coating varies along the shank of the fastener.

9. The method according to claim 8, wherein modifying the coating comprises forming a first thickness of the coating proximate a first end of the shank and forming a second thickness of the coating at a second end of the shank, wherein the first thickness is greater than the second thickness.

10. The method according to claim 8, further comprising pretreating the fastener to enable the coating to adhere to the fastener.

11. The method according to claim 8, wherein applying the coating comprises at least one of spraying the coating onto the fastener and dipping the fastener into the coating.

12. The fastening device of claim 2, wherein said first end and said first thickness combine to define a first diameter of said fastening device, and wherein said first diameter is larger than a diameter of said opening.

13. A fastener insertion system comprising:
a fastening device for insertion into an opening of an assembly, the fastening device comprising:
a fastener comprising a head and a shank extending from said head; and
a coating formed on said fastener, wherein said coating is pliable when a heat source is applied, wherein said coating is electrically conductive and comprises a varying thickness along said shank prior to insertion into the opening, and wherein the coating includes a more uniform thickness after insertion into the opening;
an end effector configured to insert said fastening device into the opening; and
an induction coil coupled to the end effector, the induction coil configured to heat said coating to a melting temperature of said coating to place said coating into a softened state.

14. The fastening device of claim 13, further comprising:
a sensor configured to measure a temperature of the induction coil, and
a processor communicatively coupled to the end effector, the induction coil, and the sensor, wherein the processor is configured to control operation of at least the induction coil to maintain the induction coil at the melting temperature of the coating.

15. The fastener insertion system according to claim 14, wherein the sensor is configured to measure the temperature within the induction coil and to send a signal to the processor if the measured temperature is outside a predetermined temperature range, and wherein the processor includes a timing circuit configured to measure an amount of time the fastening device is positioned in induction coil.

16. The fastener insertion system according to claim 13, further comprising a fastener feed head coupled to the end effector and configured to insert the fastening device into the assembly opening after the coating is at least partially melted in the induction coil.

17. The fastening device of claim 13, wherein said shank comprises a first end and an opposing second end, wherein said coating has a first thickness proximate to the shank first end and a second thickness proximate to the shank second end, said first thickness being greater than said second thickness.

18. The fastening device of claim 13, wherein said coating includes a first coating portion extending between a shank first end and a shank second end, the first coating portion having a first thickness proximate to the shank first end and a second thickness proximate the shank second end.

19. The fastening device of claim 18, wherein said fastener comprises a threaded portion extending from said shank, wherein said coating includes a second coating portion extending a first distance along said threaded portion, wherein said first distance is substantially similar to said first thickness.

20. The fastening device of claim 18, wherein said first coating portion is formed unitarily with the second coating portion.

21. The method according to claim 8, wherein, wherein said coating includes a first coating portion extending between a shank first end and a shank second end, the first coating portion having a first thickness proximate to the shank first end and a second thickness proximate the shank second end.

22. The method according to Claim 21, wherein said fastener comprises a threaded portion extending from said shank, wherein said coating includes a second coating portion extending a first distance along said threaded portion, wherein said first distance is substantially similar to said first thickness.

23. The method according to claim 22, wherein said first coating portion is formed unitarily with the second coating portion.

24. The method according to claim 8, wherein said coating comprises a bismuth alloy.

25. The method according to claim 8, wherein said coating has a melting temperature above 180 degrees Fahrenheit (82.2 degrees Celsius).

* * * * *